(12) United States Patent
Kato (10) Patent No.: US 10,298,693 B2
(45) Date of Patent: May 21, 2019

(54) VIRTUAL-MACHINE DYNAMIC ALLOCATION SYSTEM AND SERVER

(71) Applicant: Oki Electric Industry Co., Ltd., Tokyo (JP)

(72) Inventor: Kei Kato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 265 days.

(21) Appl. No.: 15/297,242

(22) Filed: Oct. 19, 2016

(65) Prior Publication Data

US 2017/0155721 A1    Jun. 1, 2017

(30) Foreign Application Priority Data

Nov. 26, 2015   (JP) ................................. 2015-230663

(51) Int. Cl.
*G06F 15/16*   (2006.01)
*H04L 29/08*   (2006.01)
*H04L 29/06*   (2006.01)

(52) U.S. Cl.
CPC ............ *H04L 67/125* (2013.01); *H04L 67/42* (2013.01)

(58) Field of Classification Search
CPC .................................................. H04L 67/1002
USPC ....................................................... 709/209
See application file for complete search history.

(56) References Cited

U.S. PATENT DOCUMENTS

| 2006/0155862 | A1* | 7/2006 | Kathi | ...................... | H04L 45/38 709/229 |
| 2009/0113447 | A1* | 4/2009 | Kamiyai | ............. | H04L 43/0852 719/314 |
| 2009/0271798 | A1* | 10/2009 | Iyengar | ................... | G06F 9/505 718/105 |
| 2011/0078303 | A1* | 3/2011 | Li | ........................... | G06F 9/505 709/224 |
| 2015/0142921 | A1* | 5/2015 | Yamada | .............. | H04L 67/1002 709/219 |

FOREIGN PATENT DOCUMENTS

JP             2013-090277 A         5/2013

* cited by examiner

*Primary Examiner* — Hamza N Algibhah
(74) *Attorney, Agent, or Firm* — Rabin & Berdo, P.C.

(57) ABSTRACT

A slave server with an optimal response time with respect to a program can be selected from slave servers located near a client. A virtual-machine dynamic allocation system according to the present invention in which a master server dynamically allocates a virtual machine that is to execute a requested program to any one of slave servers, includes: a response-measurement-time-information measuring unit configured to measure response-time information about a period between transmission of a request signal from each slave server to each of programs operating in the master server and reception of a response signal from each program in the master server; a response-time-information storage unit configured to store the measured response-time information of each program for each slave server; and a slave-server determining unit configured to refer to the response-time-information storage unit so as to determine a slave server that is to execute the requested program.

5 Claims, 7 Drawing Sheets

| SERVER IDENTIFICATION INFORMATION | APPLICATION-RESPONSE MEASUREMENT VALUE (MILLISECONDS) |
|---|---|
| SLAVE SERVER 20-1 | A |
| SLAVE SERVER 20-2 | B |
| ⋮ | ⋮ |

FIG. 3

| SERVER IDENTIFICATION INFORMATION | CPU PERFORMANCE |
|---|---|
| SLAVE SERVER 20-1 | aaaa xxx-3000(2.6GHz) |
| SLAVE SERVER 20-2 | bbbb yyy-2000(3.6GHz) |
| ⋮ | ⋮ |

VIRTUAL-MACHINE DYNAMIC ALLOCATION SYSTEM AND SERVER

CROSS REFERENCE TO RELATED APPLICATION(S)

This application is based upon and claims benefit of priority from Japanese Patent Application No. 2015-230663, filed on Nov. 26, 2015, the entire contents of which are incorporated herein by reference.

BACKGROUND

The present invention relates to virtual-machine dynamic allocation systems and servers, and is applicable to, for example, a dynamic allocation system for a virtual machine that operates a program (e.g., application program) in a distributed network.

With recent developments in network technologies and computer technologies, there has been advancement in a so-called cloud computing technology.

Cloud computing involves setting general computer servers (referred to as "servers" hereinafter) in various stations, causing a server in the cloud to acquire input data from a client, causing the server to operate an application to be used by the client, and causing the server to return output data to the client via a communication environment.

A cloud environment is used by many users. Since the scale of a cloud environment is large, identical servers are set at many locations around the world. Therefore, which of the servers is to be used for performing application operation requested by a client varies depending on the situation. For example, a situation where a request from a client in Japan is transmitted to a server in Brazil, which is on the other side of the globe, and the server in Brazil sends back data to the client in Japan may possibly occur.

The internet-of-things (IoT) service is attracting attention today.

In the IoT service, many devices or things have a communication function and are connected to a network. When the IoT service is provided, applications have to have real-time properties and the amount of traffic in the network has to be increased. Also, a method of accumulating so-called big data is demanded.

For example, there is a service in which a server instantaneously performs an analysis based on detailed data from a sensor of a device provided in a factory. In this case, there is the problem that the service is not suitable for this use since the response time of an application is slow.

Furthermore, in the case of an application in which real-time properties are strongly desired, for example, in traffic control, such as a traffic light, or in a vehicle driving system, it is conceivable that a processing delay of about several hundreds of milliseconds could become fatal.

As a countermeasure against the problems described above, JP 2013-90277A proposes an edge computing technology in which small-scale slave servers (also called edge servers) are set at locations physically near users to shorten communication delays so that real-time properties of applications are achieved.

Edge computing is a type of a distributed network in which a slave server (edge server) intervening between a master server in the cloud and a client performs, for example, data storage and arithmetic processing.

SUMMARY

However, in an environment in which a client is connectable to slave servers located physically near the client, it is a problem which slave server is made to execute application operation. This is because, for example, even in a case where a slave server located physically near the client is to execute the application operation, it does not necessarily mean a fast response from that slave server from the standpoint of real-time properties.

Accordingly, there is a demand for a virtual-machine dynamic allocation system and a server in which a slave server with an optimal response time with respect to an application can be selected from slave servers located near a client.

A virtual-machine dynamic allocation system which is provided to solve the problem, and in which a master server dynamically allocates a virtual machine that is to execute a requested program to any one of slave servers, includes: (1) a response-measurement-time-information measuring unit configured to measure response-time information about a period between transmission of a request signal from each slave server to each of programs operating in the master server and reception of a response signal from each program in the master server; (2) a response-time-information storage unit configured to store the measured response-time information of each program for each slave server; and (3) a slave-server determining unit configured to refer to the response-time-information storage unit so as to determine a slave server that is to execute the requested program.

A slave server that is provided from another aspect and executes a program requested by an activated virtual machine in accordance with a command of a master server, includes: a response-measurement-time-information measuring unit configured to measure response-time information about a period between transmission of a request signal to each of programs operating in the master server and reception of a response signal from each program in the master server.

A master server that is provided from another aspect and commands any one of slave servers to serve as a virtual machine that is to execute a requested program, includes: (1) an acquiring unit configured to acquire, from each slave server, response-time information about a period between transmission of a request signal from each slave server to each of programs operating in the master server and reception of a response signal from each program in the master server; (2) a response-time-information storage unit configured to store the measured response-time information of each program for each slave server; and (3) a slave-server determining unit configured to refer to at least the response-time-information storage unit so as to determine a slave server that is to execute the requested program.

According to the present invention, a slave server with an optimal response time with respect to an application can be selected from slave servers located near a client.

DETAILED DESCRIPTION OF THE EMBODIMENTS

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

A. Main Embodiments

Embodiments of a virtual-machine dynamic allocation system and a server according to the present invention will be described in detail below with reference to the drawings.

A.1. Configuration of Embodiment

Figure 1:
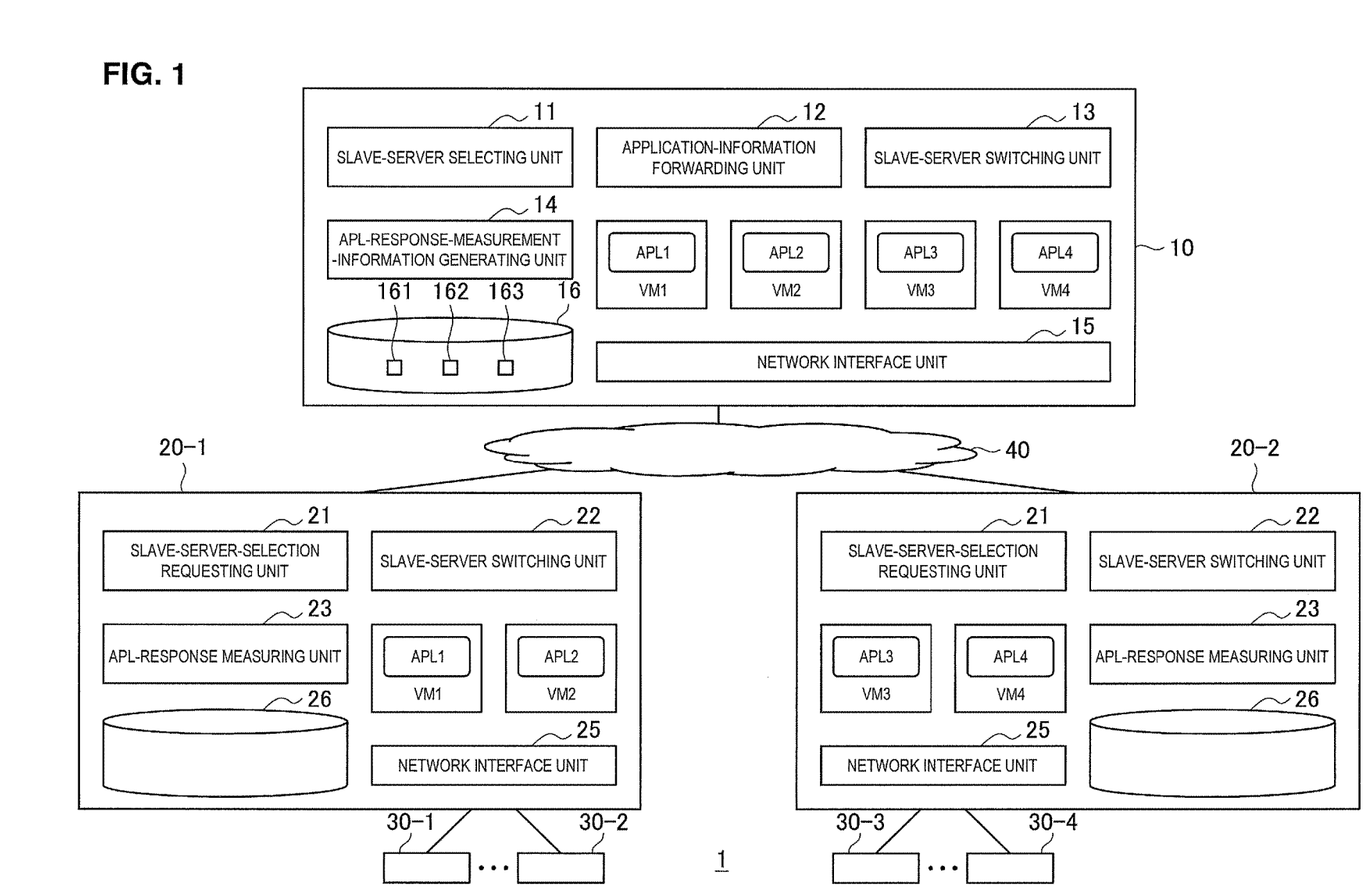
FIG. 1 illustrates the overall configuration of a network system according to an embodiment.

FIG. 1 illustrates the overall configuration of a network system according to an embodiment.

In FIG. 1, a network system 1 according to an embodiment has a master server 10, slave servers 20-1 and 20-2, clients 30-1 to 30-4, and a network 40.

When identical components in the slave servers 20-1 and 20-2 and in the clients 30-1 to 30-4 are to be described below, the expressions slave servers 20 and clients 30 will be used. Furthermore, the number of master servers 10, slave servers 20, and clients 30 is not particularly limited.

In FIG. 1, the network system 1 according to the embodiment is assumed to be a distributed network system in which slave servers (edge servers) 20 disposed at locations physically near the clients 30 virtually execute application operation in a cloud environment.

In the network system 1, the master server 10 and the slave servers 20 each include a virtualization environment for establishing a cloud environment. Specifically, the master server 10 and the slave servers 20 each have a virtualization environment that activates a virtual machine (VM) in an operating system (OS) so that the virtual machine executes application operation.

An application (i.e., application program) is a software program for executing information processing requested by a user. An application collects data from a client and performs, for example, data statistical processing and data analysis processing. It is assumed that real-time properties are demanded in an application.

Although an application is not particularly limited as long as real-time properties are demanded therein. Examples include those used in energy management systems, such as traffic control, a vehicle driving system, a business system, various types of management systems, a home energy management system (HEMS), a building energy management system (BEMS), and a factory energy management system (FEMS).

A client 30 makes a request for desired application operation to a server (i.e., the master server 10 or a slave server 20) in the cloud.

Although the hardware configuration of each client 30 is not illustrated in the drawings, each client 30 has arithmetic processors, such as a communication device (e.g., near-field wireless communication, wireless communication, or wired communication), a CPU, a ROM, a RAM, and an input-output interface. A client provides input data (e.g., various types of data, such as sensor data) with respect to an application to a server in the cloud and acquires data obtained in accordance with application operation from the server.

In FIG. 1, the master server 10 has a slave-server selecting unit 11, an application-information forwarding unit 12, a slave-server switching unit 13, an application-response-measurement-information generating unit 14, virtual machines (VMs) 1 to 4, a network interface unit 15, and a storage unit 16.

The hardware configuration of the master server 10 is not illustrated, but is similar to that of a general-purpose server in having, for example, a CPU, a ROM, a RAM, an EEPROM, an input-output interface unit, and a communication device. The various functions of the master server 10 are realized by the CPU executing processing programs stored in the ROM. Alternatively, the various functions of the master server 10 may be established by installing the processing programs. Even in that case, the processing programs can be expressed with the configuration blocks illustrated in FIG. 1.

The master server 10 has all applications that can be provided via a cloud service, and a VM activated in the OS executes an application (expressed as "APL" hereinafter) requested by a client 30.

FIG. 1 illustrates that a VM is executing an APL in the master server 10. However, a slave server 20 selected by the master server 10 substantially executes an application requested by a client 30. Therefore, the master server 10 has a function of responding to requests from the clients 30 and the slave servers 20.

The master server 10 selects a slave server 20 disposed physically near a client 30, which is a user, and dynamically allocates an application to that slave server 20.

The network interface unit 15 exchanges information with the network 40, for example, in accordance with TCP/IP.

The VM 1 to VM 4 are virtual machines that are to be activated in the OS of the master server 10. The VM 1 to VM 4 respectively execute an APL 1 to an APL 4 requested by the clients 30. The VM 1 to VM 4 have data required for executing the APL 1 to APL 4 stored in the storage unit 16 such as an HDD, and respectively execute the APL 1 to APL 4 by using data acquired from the clients 30.

FIG. 1 illustrates a case where four APLs 1 to 4 are respectively executed by the VM 1 to VM 4. Needless to say, the number of APLs is not limited, or the number of VMs activated for executing the APLs is not limited.

The slave-server selecting unit 11 selects a slave server that is to execute an application requested by a client 30 from among the distributively-arranged slave servers 20.

Specifically, when the slave-server selecting unit 11 receives a server selection inquiry from a slave server 20 that has acquired a request (i.e., usage request) for an application from a client 30, the slave-server selecting unit 11 selects an optimal slave server 20 for executing the requested application in accordance with a predetermined server selecting method. Furthermore, the slave-server selecting unit 11 commands the selected slave server 20 to execute the application. Consequently, an optimal slave server 20 for virtually executing the application requested by the client 30 can be selected. The server selecting method used by the slave-server selecting unit 11 will be described later in detail in the section describing the operation.

The application-information forwarding unit 12 forwards information required for executing the application requested by the client 30 to the slave server 20 selected by the slave-server selecting unit 11 or to a switching-destination slave server 20 selected by the slave-server switching unit 13.

In this case, the application-information forwarding unit 12 performs virtual-machine dynamic allocation by, for example, forwarding information related to the client 30, which is the application requesting source, designating the type of application requested by the client 30, and forwarding data required for executing the application (e.g., data stored in the HDD). The method of forwarding the information required for executing the application for the virtual-machine dynamic allocation is not particularly limited, but various types of methods may be widely employed.

The slave-server switching unit 13 monitors the application response statuses with respect to slave servers 20 including the slave server 20 executing the application requested by the client 30, and switches to a slave server 20 with a fast response based on the monitor result.

Based on measurement information about the response times of APLs acquired from the slave servers 20, the application-response-measurement-information generating unit 14 generates application-response measurement information 161, which will be described later.

The storage unit 16 is a storage region that stores therein, for example, processing programs, applications, and data required for the applications. Moreover, the storage unit 16 also stores therein, for example, the application-response measurement information 161, a CPU performance list 162, and slave server information 163.

The application-response measurement information 161 contains, for each slave server 20, measurement information (i.e., a measurement value) obtained by measuring the response time with respect to a request made for each APL of the master server 10 by each APL of each slave server 20.

Figure 2:
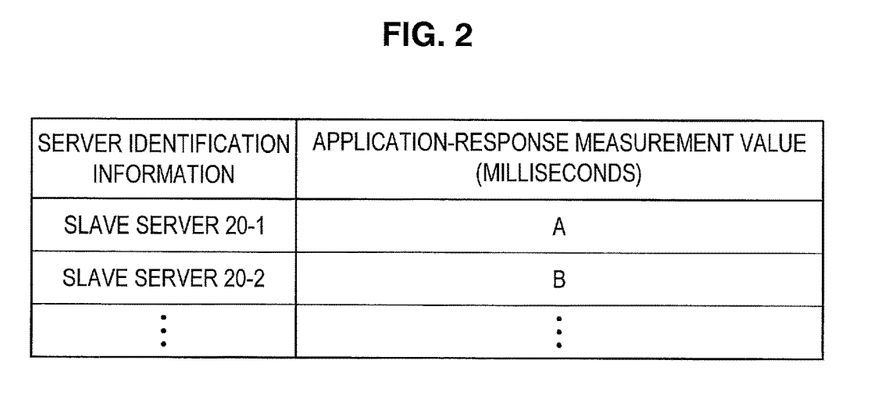
FIG. 2 illustrates the configuration of an application-response-measurement-information list according to an embodiment.

FIG. 2 illustrates the configuration of the application-response measurement information 161 according to the embodiment.

As illustrated in FIG. 2, the application-response measurement information 161 has "server identification information" and "application-response measurement value" items. Items are not limited thereto.

The application-response measurement information 161 indicates the response time with respect to each application. In a case where the response times of applications are to be measured, the application-response measurement information 161 is generated for each application.

FIG. 2 illustrates a case where one application-response measurement value is listed for each slave server 20. However, because the slave-server selecting unit 11 and the slave-server switching unit 13 periodically measures the response time, the application-response measurement information 161 may contain a temporal response time for each slave server 20.

In FIG. 2, the "server identification information" is an area indicating the identification information of each slave server 20, in which the name of the slave server 20 and the IP address of the slave server 20 are, for example, described.

The "application-response measurement value" indicates a response time (i.e., outward-and-return delay time of an application response) taken until each APL of each slave server 20 receives a response to a request transmitted from the APL of the slave server 20 to each APL of the master server 10. The application-response measurement value is measured by each slave server 20, and the application-response measurement information 161 contains this value acquired from the slave server 20.

The application-response measurement value is not intended for an outward-and-return delay time on a network of a lower layer (such as a physical layer or a network layer), but is intended for a response time of a layer including an application layer.

The quickness of a response demanded by each client 30 corresponds to the shortness of a response time with respect to operation for executing an application. When measuring the outward-and-return delay time of a lower layer, it is not possible in some cases to sufficiently secure the real-time properties of an application. Moreover, even in a case where a slave server 20 located physically near a client 30 is to perform application operation, the response of an application is not always fast.

In this embodiment, in order to select a slave server 20 with a fast response to an application, the response time of the application (i.e., outward-and-return delay time of the application) is measured.

Figure 3:
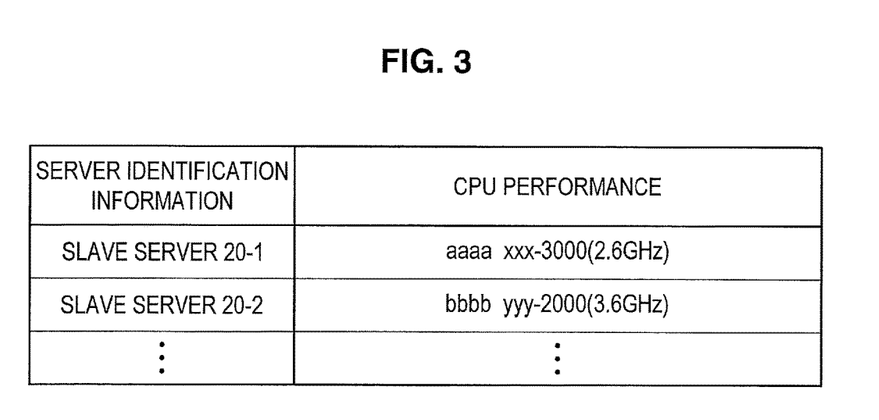
FIG. 3 illustrates the configuration of a CPU performance list according to an embodiment.

The CPU performance list 162 contains, for each slave server 20, the performance of the CPU with which the slave server 20 is equipped.

FIG. 3 illustrates the configuration of the CPU performance list 162 according to the embodiment.

In FIG. 3, the CPU performance list 162 has "server identification information" and "CPU performance" items. These items are not limited thereto.

The "CPU performance" indicates the performance information of the CPU with which each slave server 20 is equipped. In FIG. 3, for example, "aaaa xxx-3000 (2.6 GHz)" indicates the CPU model number. Specifically, "aaaa" indicates the CPU manufacturer's name, "xxx" indicates the CPU name, "3000" indicates the model number, and "2.6 GHz" indicates the clock number. In this way, the CPU performance may be information about the CPU model number or a relative evaluation value obtained by relatively evaluating the CPU performance in accordance with the grade of the CPU (e.g., a relative evaluation value of the CPU performance evaluated based on five grades).

The information related to the CPU performance of each slave server 20 may be information acquired by packet-switching between the master server 10 and the slave server 20 or may be preset information if the CPU performance of the slave server 20 can be recognized in advance.

The slave server information 163 contains information such as address information (e.g., an IP address) and positional information (e.g., the latitude and longitude and physically-set positional information) of each slave server 20. Moreover, the slave server information 163 contains information in which each slave server 20 and the type of application executed by the slave server 20 are associated with each other.

In FIG. 1, each slave server 20 has a slave-server-selection requesting unit 21, a slave-server switching unit 22, an application-response measuring unit 23, VMs, a network interface unit 25, and a storage unit 26.

The hardware configuration of each slave server 20 is not illustrated but is similar to that of a general-purpose server in having, for example, a CPU, a ROM, a RAM, an EEPROM, an input-output interface unit, and a communication device. The various functions of the slave server 20 are realized by the CPU executing processing programs stored in the ROM. Alternatively, the various functions of the slave server 20 may be established by installing the processing programs. Even in that case, the processing programs can be expressed with the configuration blocks illustrated in FIG. 1

Each slave server 20 is a server disposed at a location physically near a client 30. Each slave server 20 executes an application designated by the master server 10 and requested by a client 30, and performs application operation by acquiring data from the client 30.

For example, in the slave server 20-1, the VM 1 executes the APL 1 and the VM 2 executes the APL 2. In the slave server 20-2, the VM 3 executes the APL 3 and the VM 4 executes the APL 4.

The network interface unit 25 exchanges information with a client 30 and also exchanges information with the master server 10.

For example, the network interface unit 25 may exchange information with a client 30 through near-field wireless communication. Furthermore, the network interface unit 25 may exchange information with the master server 10 in accordance with TCP/IP.

The VM 1 to VM 4 are virtual machines that respectively execute the APL 1 to APL 4, which are designated by the master server 10 and requested by the clients 30, in the OS.

When the slave-server-selection requesting unit 21 acquires a request for using an application from a client 30, the slave-server-selection requesting unit 21 makes a request for selecting a slave server 20 that is to execute the application to the master server 10.

The slave-server switching unit 22 regularly inquires the master server 10 whether or not it is necessary to switch to another slave server 20.

The application-response measuring unit 23 measures the response time with respect to a request including dummy information transmitted by each APL to each APL of the master server 10. The application-response measuring unit 23 regularly measures the response time of each APL. Furthermore, the application-response measuring unit 23 transmits the measured response time of each APL to the master server 10.

The storage unit 26 is a storage region that stores therein, for example, processing programs, applications, and data required for the applications.

A.2. Operation of Embodiment

Next, the operation of the method of dynamically allocating the applications in the network system 1 according to the embodiment will be described in detail with reference to the drawings.

Figure 4:
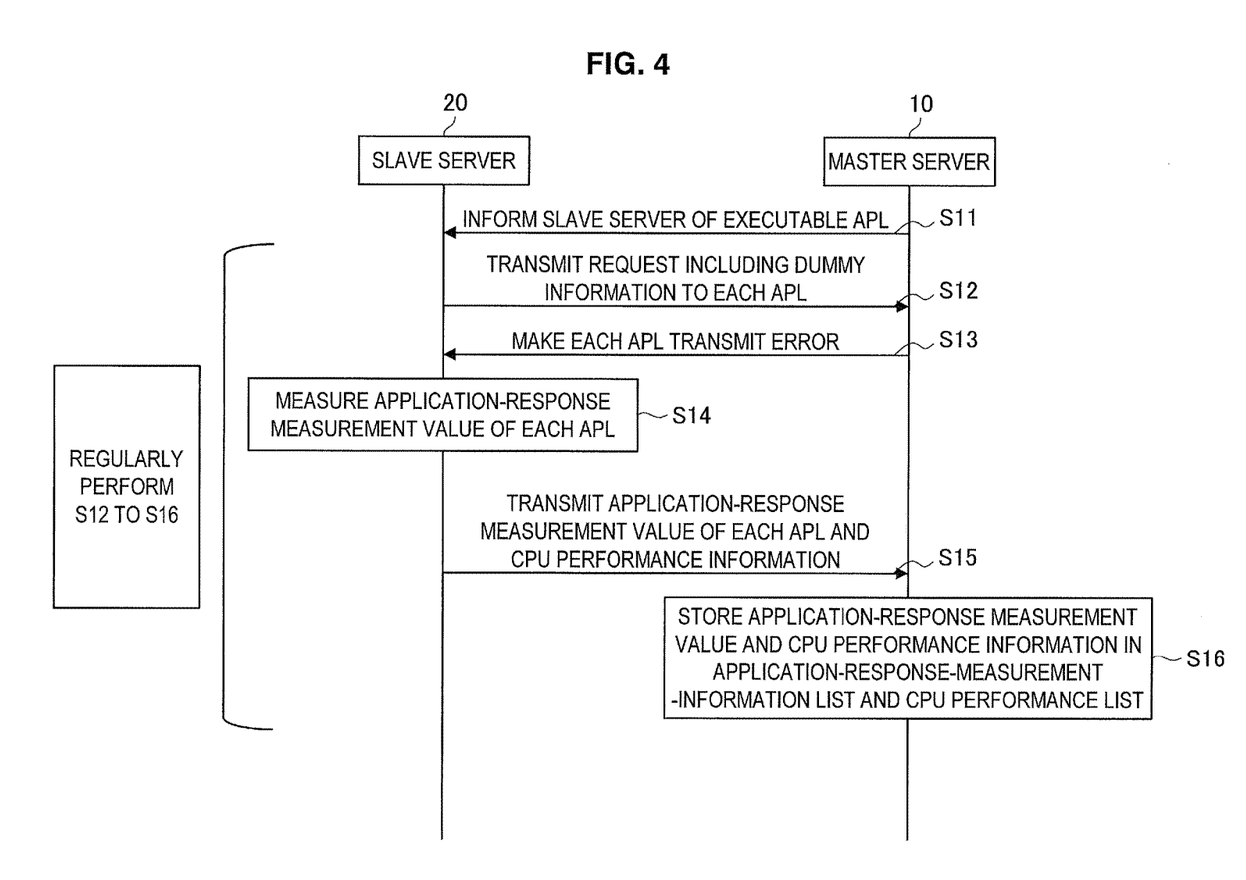
FIG. 4 is a sequence diagram illustrating a process for generating an application-response-measurement-information list in accordance with an embodiment.

A.2.1. Operation for Generating
Application-Response-Measurement-Information
List FIG. 4 is a sequence diagram illustrating a process for generating an application-response-measurement-information list in accordance with the embodiment.

For example, it is assumed that there are APL 1 to APL 4 as applications executable by the master server 10 in the cloud.

In order to provide information about the types of executable applications, the master server 10 constantly informs each slave server 20 that the master server 10 is operating the APL 1 to APL 4 (S11).

Although the informing method is not particularly limited, but, for example, the master server 10 can inform each slave server 20 of a packet containing list information indicating the APL 1 to APL 4 indicating the types of executable applications.

In each slave server 20, the application-response measuring unit 23 regularly transmits a request including dummy information to each of the APL 1 to APL 4 of the master server 10 (S12).

The contents of the dummy information may vary depending on the type of application.

For example, if an application is SIP, an application of each slave server 20 may use an invite message of SIP to transmit dummy information with blank message contents (e.g., all zeros).

Furthermore, for example, an application of each slave server 20 may transmit dummy information containing data to which the applications of the master server 10 are not to respond (i.e., data with no meanings).

More specifically, information to be used when a printed circuit board is installed into each slave server 20 may be set in advance, and this information may be used as the dummy information. For example, when the printed circuit board to be installed in each slave server 20 is assembled, bar-code information read from a printed-circuit-board assembly machine may be used as the dummy information. The bar-code information used when the printed circuit board is assembled includes, for example, a bar-code number as well as a process start flag and a process end flag for assembling the printed circuit board. Each slave server 20 transmits, for example, the read bar-code information (i.e., information containing a bar-code number and a process start flag) as the dummy information to the APLs of the master server 10. In this case, since the information is non-registered information in the APLs of the master server 10, the APLs of the master server 10 perform an error response.

When receiving the request including the dummy information from each slave server 20, each of the APL 1 to APL 4 in the master server 10 sends back response information with respect to that request (S13). Specifically, in the master server 10, an error occurs in each of the APL 1 to APL 4 that have received the request including the dummy information. Therefore, an error response is sent back to the APLs of each slave server 20.

In each slave server 20, the application-response measuring unit 23 manages the transmission time of the request including the dummy information and the reception time of the error response, and measures application-response measurement information from the difference between the transmission time and the reception time (S14).

Furthermore, each slave server 20 transmits, to the master server 10, information containing the application-response measurement information and information related to the CPU performance thereof (S15). In a case where the information related to the CPU performance has already been transmitted to the master server 10, each slave server 20 may be configured not to transmit the information related to the CPU performance to the master server 10 thereafter.

In the master server 10, the application-response-measurement-information generating unit 14 stores the application-response measurement information, which is received from each slave server 20, into the application-response measurement information 161. Moreover, in the master server 10, the application-response-measurement-information generating unit 14 stores the information related to the CPU performance of each slave server 20, which is received from the slave server 20, into the CPU performance list 162 (S16).

The slave servers 20 and the master server 10 regularly perform the process from S12 to S16.

A.2.2. Selection Process of Slave Server 20

First, a selection process of a slave server 20 when a client 30 makes a request for using an application will be described with reference to FIG. 5.

Figure 5:
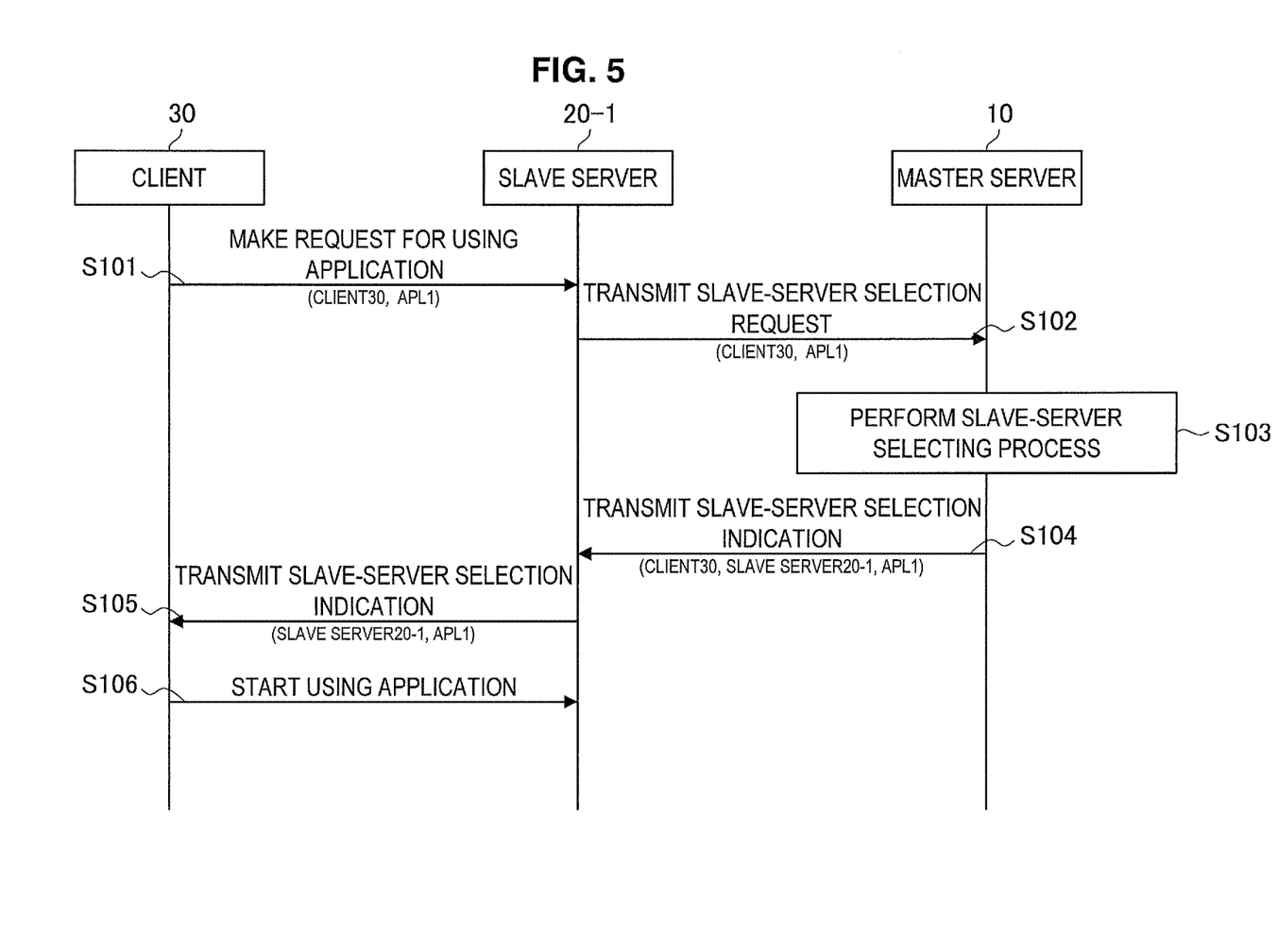
FIG. 5 is a sequence diagram illustrating a selection process of a slave server in accordance with an embodiment.

FIG. 5 is a sequence diagram illustrating the selection process of a slave server 20 in accordance with the embodiment.

A client 30 makes a request for using the APL 1 to the slave server 20-1 (S101).

The slave server 20-1 transmits, to the master server 10, a selection request for a slave server 20 that is to execute the APL 1 requested by the client 30 (S102).

In the master server 10, the slave-server selecting unit 11 measures the response times of the applications in the respective slave servers 20 and selects a slave server 20 that is to execute the APL 1 requested by the client 30 based on the measurement result (S103).

Figure 6:
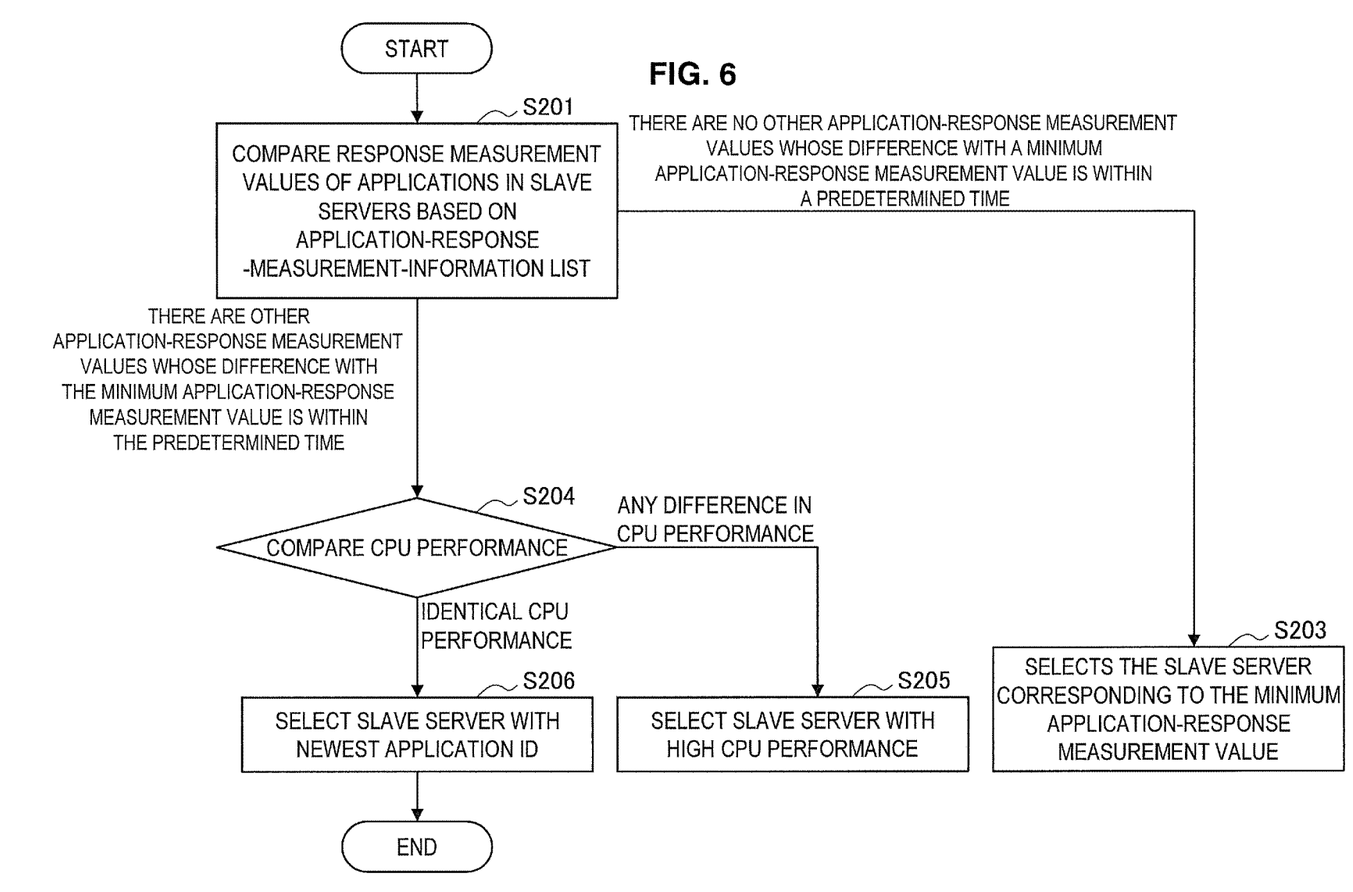
FIG. 6 is a flowchart illustrating a selection process of a slave server that is to execute an application requested by a client in accordance with an embodiment.

FIG. 6 is a flowchart illustrating a selection process of a slave server that is to execute an application requested by a client 30 in accordance with the embodiment.

First, in the master server 10, the slave-server selecting unit 11 refers to the application-response measurement information 161 to compare response measurement values of the APL 1 to APL 4 in the slave servers 20 (S201).

In this case, the application-response measurement information 161 contains application-response measurement values of the slave servers 20 for each APL. Therefore, the slave-server selecting unit 11 compares the application-response measurement values of the slave servers 20 with respect to the APL requested by the client 30.

If there are no other application-response measurement values whose difference with a minimum application-response measurement value is within a predetermined time, the slave-server selecting unit 11 selects the minimum application-response measurement value and selects the slave server 20 corresponding to the minimum application-response measurement value (S203).

A situation where the selection of an optimal slave server 20 is not sufficient may occur due to a small difference between the minimum application-response measurement value and other values. In the embodiment, the application-response measurement values are arranged in ascending order, and if there are other application-response measurement values whose difference with the minimum application-response measurement value is within the predetermined time, the process proceeds to step S204.

The slave-server selecting unit 11 refers to the CPU performance list 162, and if there are other application-response measurement values whose difference with the minimum application-response measurement value is within the predetermined time, the slave-server selecting unit 11 compares the CPU performance between slave servers 20 corresponding to the minimum response measurement value and the other application-response measurement values (S204).

Then, if there is a difference in the CPU performance between the slave servers 20 (S204), the slave server 20 with the highest CPU performance is selected from among the slave servers 20 corresponding to the minimum response measurement value and the other application-response measurement values (S205).

The reason for preferentially selecting the slave server 20 with the high CPU performance will now be described. A slave server 20 equipped with a CPU having high CPU performance has high throughput and thus achieves fast response to an application. For example, it is also conceivable to select a slave server 20 in view of the current CPU processing load.

However, the recent advancement in the CPU technology has made the CPU throughput significantly higher. Therefore, even if, for example, the CPU processing load is large at present, high CPU performance tends to shorten the application response time over time.

In this embodiment, if there are slave servers 20 with identical application-response measurement values (i.e., within a predetermined range), the slave-server selecting unit 11 selects the slave server 20 with the high CPU performance.

In step S204, if there is no difference in the CPU performance between the slave servers 20, the slave server 20 with the newest application ID is selected (S206). Specifically, a slave server 20 that is previously (i.e., already) allocated is selected as the slave server 20 that is to execute the APL requested by the client 30.

The selection process of a slave server 20 will be described with reference to step S103 in FIG. 5 again.

In step S103, the slave-server selecting unit 11 selects the slave server 20-1 as a server that is to execute the APL 1 requested by the client 30. Then, the master server 10 transmits a slave-server selection indication to the slave server 20-1 (S104).

The master server 10 forwards, for example, the APL 1 requested by the client 30 and data required for executing the application to the slave server 20-1.

In order to inform the client 30 that the server that is to execute the APL 1 is a slave server, the slave server 20-1 transmits a slave-server selection indication thereto (S105).

Subsequently, the client 30 transmits data required for the operation of the APL 1 to the slave server 20-1 and starts using the APL 1 (S106).

A.2.3. Switching Method (1) of Slave Servers 20

Next, a process of a slave-server-20 switching method initiatively performed by each slave server 20 will be described with reference to FIG. 7.

Figure 7:
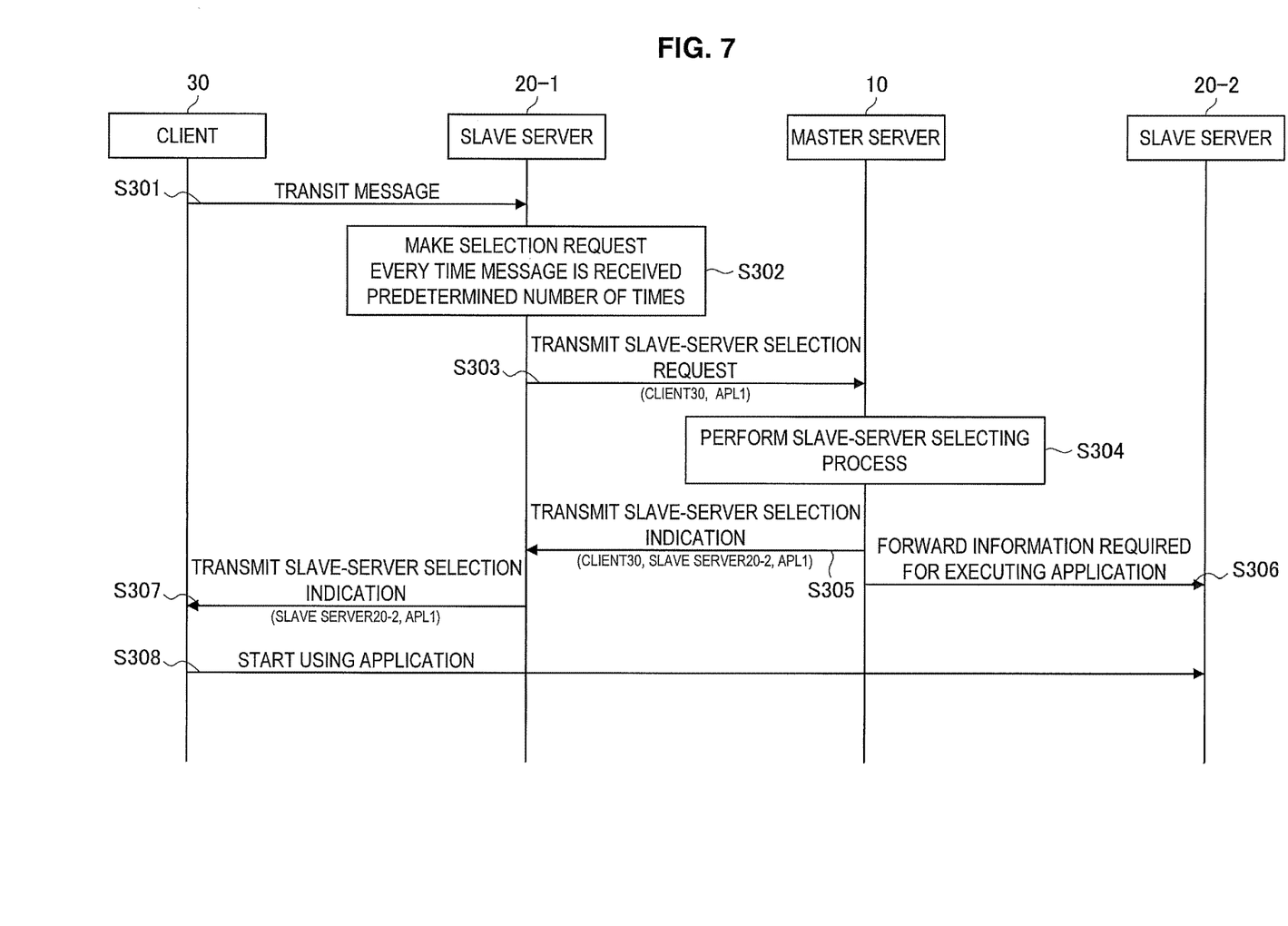
FIG. 7 is a sequence diagram (1) illustrating a slave-server switching process in accordance with an embodiment.

FIG. 7 is a sequence diagram illustrating a switching process of the slave servers 20 in accordance with the embodiment.

In this case, it is assumed that the slave server 20-1 is executing an application requested by a client 30.

The client 30 transmits a message required for executing an application (i.e., a message containing data) to the slave server 20-1 (S301).

In the slave server 20-1, the slave-server switching unit 22 measures the number of times the message is received from the client 30. Then, when the number of times the message is received from the client 30 reaches a predetermined number of times (e.g., 10 times), the slave-server switching unit 22 transmits, to the master server 10, a slave-server selection request for inquiring about an optimal slave server 20 (S302 and S303).

In the master server 10, the slave-server selecting unit 11 refers to the application-response measurement information 161 to select the slave server 20-2 that is to execute the APL 1 requested by the client 30 (S304). In step S304 in FIG. 7, the selection process of a slave server 20 described with reference to FIG. 6 is performed. A detailed description of the selection process of a slave server 20 in FIG. 6 will be omitted.

Subsequently, the slave-server selecting unit 11 selects the slave server 20-2 as a server that is to execute the APL 1 requested by the client 30. Then, the master server 10 transmits a slave-server selection indication to the slave server 20-1 (S305). Specifically, the master server 10 transmits, to the slave server 20-1, a slave-server selection indication including an indication that the switching destination that is to execute the APL 1 requested by the client 30 is the "slave server 20-2".

Furthermore, in the master server 10, the application-information forwarding unit 12 forwards, for example, the APL 1 requested by the client 30 and data required for executing the application to the slave server 20-2 (S306).

In order to inform the client 30 that the server that is to execute the APL 1 is the slave server 20-2, the slave server 20-1 transmits a slave-server selection indication thereto (S307).

Subsequently, the client 30 transmits data required for the operation of the APL 1 to the slave server 20-2 and starts using the APL 1 (S308).

A.2.4. Switching Method (2) of Slave Servers 20

Next, a process of a slave-server-20 switching method initiatively performed by the master server 10 will be described with reference to FIG. 8.

Figure 8:
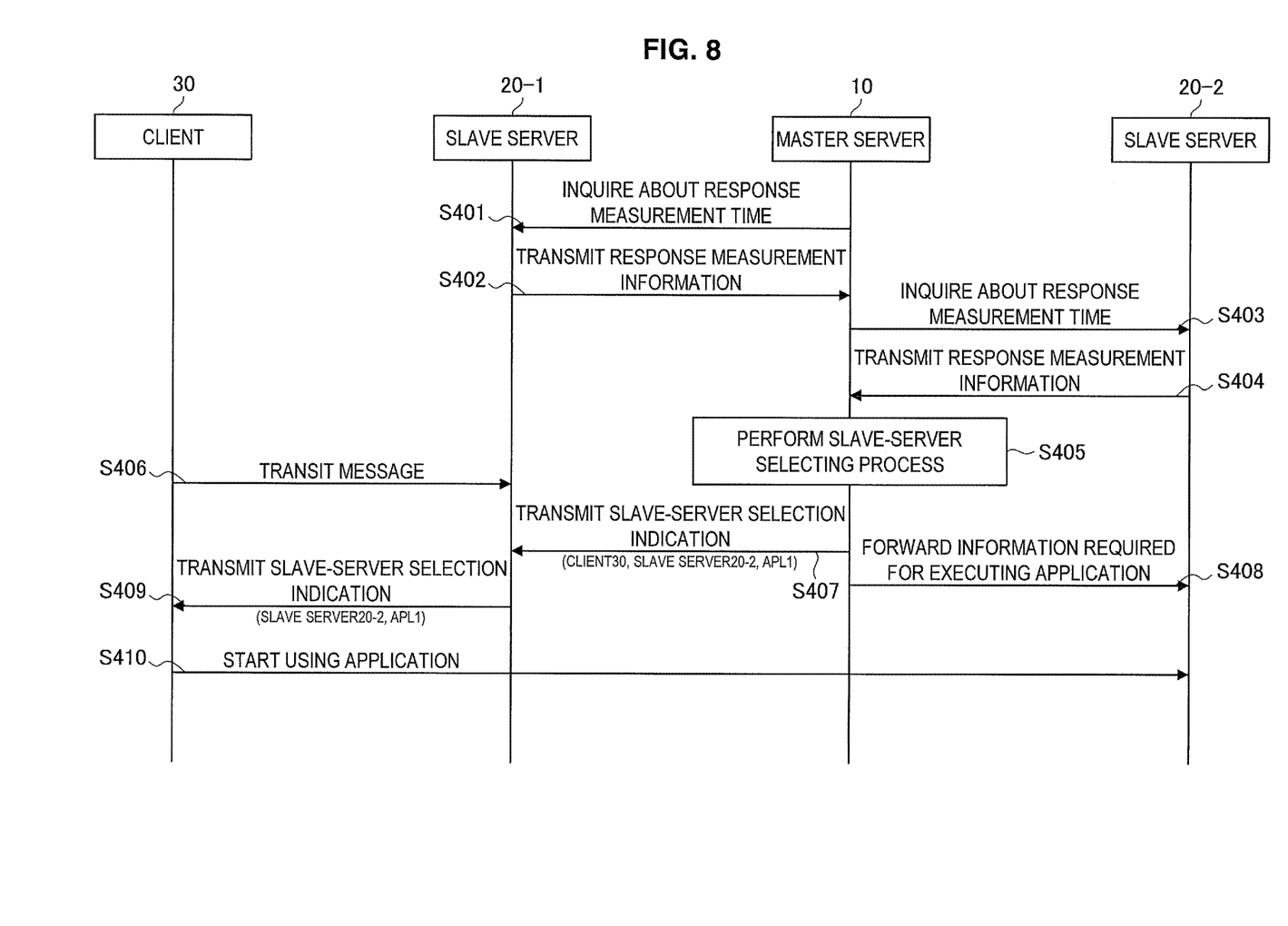
FIG. 8 is a sequence diagram (2) illustrating a slave-server switching process in accordance with an embodiment.

FIG. 8 is a sequence diagram illustrating a switching process of the slave servers 20 in accordance with the embodiment.

In this case, it is assumed that the slave server 20-1 is executing an application requested by a client 30.

In the master server 10, the slave-server switching unit 13 inquires the slave servers 20-1 and 20-2 about the application-response measurement information on a regular basis (e.g., every minute or several minutes). In the slave servers 20-1 and 20-2, each of the APL 1 to APL 4 transmits a request including dummy information to each APL of the master server 10. The slave servers 20-1 and 20-2 then measure the response time taken to receive a response, and transmit the response measurement information to the master server 10 (S401 to S404).

In the master server 10, the slave-server selecting unit 11 refers to the application-response measurement information 161 to select the slave server 20-2 that is to execute the APL 1 requested by the client 30 (S405). In step S405 in FIG. 8, the selection process of a slave server 20 described with reference to FIG. 6 is performed. A detailed description of the selection process of a slave server 20 in FIG. 6 will be omitted.

Until the switching of slave servers 20 is performed, the client 30 transmits a message required for executing an application (i.e., a message containing data) to the slave server 20-1 (S406).

Subsequently, the slave-server selecting unit 11 selects the slave server 20-2 as a server that is to execute the APL 1 requested by the client 30. Then, the master server 10 transmits a slave-server selection indication to the slave server 20-1 (S407). Specifically, the master server 10 transmits, to the slave server 20-1, a slave-server selection indication including an indication that the switching destination that is to execute the APL 1 requested by the client 30 is the "slave server 20-2".

Furthermore, in the master server 10, the application-information forwarding unit 12 forwards, for example, the APL 1 requested by the client 30 and data required for executing the application to the slave server 20-2 (S408).

In order to inform the client 30 that the server that is to execute the APL 1 is the slave server 20-2, the slave server 20-1 transmits a slave-server selection indication thereto (S409).

Subsequently, the client 30 transmits data required for the operation of the APL 1 to the slave server 20-2 and starts using the APL 1 (S410).

A.3. Advantageous Effects of Embodiment

As described above, according to this embodiment, even when there are slave servers located physically near a client, the position of a virtual machine that is to execute an application requested by the client can be dynamically allocated. As a result, the response time of the application operation can be significantly improved.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A virtual-machine dynamic allocation system, comprising:
a plurality of slave servers; and
a master server configured to dynamically allocate a virtual machine that is to execute a requested program to one of the slave servers, the master server comprising:
an acquiring unit configured to acquire, from each of the slave servers, response-time information about a period between transmission of a request signal from each slave server to each of programs operating in the master server and reception of a response signal from each program in the master server;
a response-time-information storage unit configured to store the measured response-time information of each program for each slave server;
an arithmetic-processor-performance-information storage unit configured to store performance information of an arithmetic processor with which each of the slave servers is equipped; and
a slave-server determining unit configured to refer to the response-time-information storage unit so as to determine a slave server that is to execute the requested program, wherein the slave-server determining unit is configured to
refer to the response-time-information storage unit and the arithmetic-processor-performance-information storage unit, so as to determine a slave server that is to execute the requested program,
when another piece of response-time information, of which a difference with a minimum value of the response-time information related to the requested program is within a predetermined time, exists, refer to the arithmetic-processor-performance-information storage unit, so as to determine a slave server that is equipped with an arithmetic processor with highest performance from a slave server corresponding to the response-time information of the minimum value and a slave server corresponding to the another piece of response-time information, and
after the slave server executing the requested program intermittently makes a server switching request to the master server, determine another one of the slave servers as a switching destination.

2. The virtual-machine dynamic allocation system according to claim 1,
wherein the slave-server determining unit refers to the response-time-information storage unit so as to determine a slave server in which the response-time information related to the requested program is a minimum value.

3. The virtual-machine dynamic allocation system according to claim 1, wherein
the master server makes a request for inquiring about response measurement information of each program to each of the slave servers, and
each slave server transmits the response-time information of each program to the master server.

4. The virtual-machine dynamic allocation system according to claim 1, wherein
each of the slave servers executes a program requested by an activated virtual machine in accordance with a command of a master server, and
each of the slave servers includes a response-measurement-time-information measuring unit configured to measure response-time information about a period between transmission of a request signal to each of programs operating in the master server and reception of a response signal from each program in the master server.

5. A master server that commands any one of slave servers to serve as a virtual machine that is to execute a requested program, the master server comprising:
an acquiring unit configured to acquire, from each slave server, response-time information about a period between transmission of a request signal from each slave server to each of programs operating in the master server and reception of a response signal from each program in the master server;
a response-time-information storage unit configured to store the measured response-time information of each program for each slave server;
an arithmetic-processor-performance-information storage unit configured to store performance information of an arithmetic processor with which each of the slave servers is equipped; and
a slave-server determining unit configured to refer to the response-time-information storage unit so as to determine a slave server that is to execute the requested program,
wherein the slave-server determining unit is configured to
refer to the response-time-information storage unit and the arithmetic-processor-performance-information storage unit, so as to determine a slave server that is to execute the requested program,
when another piece of response-time information, of which a difference with a minimum value of the response-time information related to the requested program is within a predetermined time, exists, refer to the arithmetic-processor-performance-information storage unit so as to determine a slave server that is equipped with an arithmetic processor with highest performance from a slave server corresponding to the response-time information of the minimum value and a slave server corresponding to the another piece of response-time information, and
after the slave server executing the requested program intermittently makes a server switching request to the master server, determine another one of the slave servers as a switching destination.

* * * * *